United States Patent [19]

Lang

[11] 3,992,486
[45] Nov. 16, 1976

[54] PROCESS FOR ALTERING APPEARANCE OF POLYMER BY INCORPORATING THEREIN CROSSLINKED PARTICULATE POLYMERS PREPARED BY ENDOPOLYMERIZATION

[75] Inventor: E. Reed Lang, Glenside, Pa.

[73] Assignee: Rohm and Haas Company, Philadelphia, Pa.

[22] Filed: June 21, 1973

[21] Appl. No.: 372,382

Related U.S. Application Data

[60] Division of Ser. No. 113,841, Feb. 9, 1971, abandoned, which is a continuation-in-part of Ser. No. 74,250, Sept. 22, 1970, abandoned.

[52] U.S. Cl. .............................. 260/885; 260/42.29; 260/42.52; 260/836; 260/876 R; 260/886
[51] Int. Cl.² .................. C08L 31/02; C08L 51/00
[58] Field of Search ................ 260/876 R, 885, 836

[56] References Cited
UNITED STATES PATENTS

| | | | |
|---|---|---|---|
| 3,309,424 | 3/1967 | Abe et al. | 260/885 |
| 3,345,434 | 10/1967 | Griffith | 260/901 |
| 3,405,087 | 10/1968 | Fryd | 260/33.6 |

*Primary Examiner*—Richard B. Turer
*Attorney, Agent, or Firm*—Michael B. Fein

[57] ABSTRACT

A process for preparing crosslinked spherical particulate addition polymeric (<30 microns in diameter) of ethylenically unsaturated monomers and polyunsaturated crosslinking monomers, such as a polymer of styrene crosslinked with divinylbenzene, is provided. Preferably, subsequent to polymerization of the polymer particles, additional crosslinking is provided by reaction of functional groups in the addition-polymerized monomers other than carbon-to-carbon unsaturation, such as the reaction of an epoxy group with a carboxyl group. The minute particles are utilized as "pigments" in cast, molded, or extruded normally transparent plastics such as polymethyl methacrylate, or in coatings and films, to make such articles translucent, or opaque if in large proportions.

The refractive index of the particulate polymer is of course different than that of the continuous plastic matrix of the final article, and is preferably above that of the matrix.

The particles are formed by endopolymerization wherein a small amount of a polymer is dissolved in a large volume of monomers which are then polymerized, and phase separation occurs; i.e., the newly formed polymer is insoluble in the dissolved polymer, and the newly formed polymer appears as small particles dispersed in a continuous phase or matrix of the preexisting polymer.

9 Claims, 1 Drawing Figure

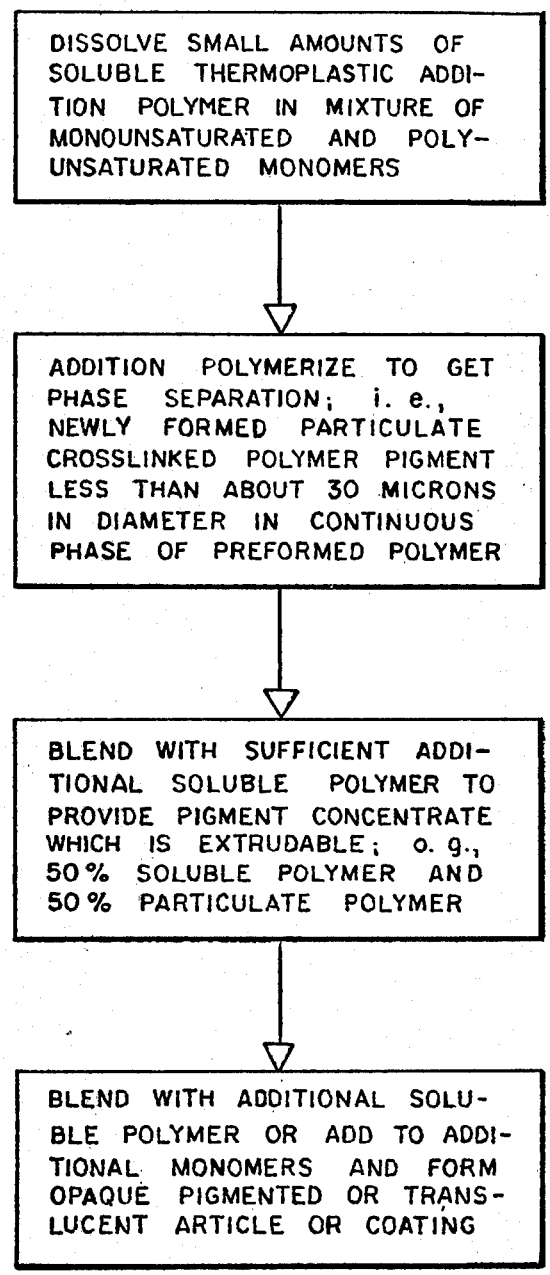

PROCESS FOR ALTERING APPEARANCE OF POLYMER BY INCORPORATING THEREIN CROSSLINKED PARTICULATE POLYMERS PREPARED BY ENDOPOLYMERIZATION

This is a divisional of Ser. No. 113,841, filed Feb. 9, 1971, now abandoned, which is a continuation-in-part of Ser. No. 74,250, filed Sept. 22, 1970, now abandoned.

The present invention relates to a process for preparing minute, generally spherical crosslinked polymer particles insoluble in olefinic monomers, the particles being below about 30 microns in diameter and, more specifically, to particulate polymers of ethylenically unsaturated monomers and polyfunctional crosslinking monomers. The particulate polymers are useful in coatings and as components of polymeric compositions a superior substitutes for conventional pigments.

For the purpose of the present invention, the following terminology is utilized:

1. The "particulate polymer" is the polymer produced by the addition polymerization of the ethylenically unsaturated monomer and the polyunsaturated crosslinking monomer which may be called primary crosslinking, preferably with additional postpolymerization reaction of additional crosslinking groups present as functional groups in the olefinic monomers, which may be called secondary crosslinking or latent crosslinking. These generally spherical crosslinked polymer particles are insoluble in monomers capable of addition polymerization and in the resulting polymers with which they are used.

2. The "soluble polymer" is any addition polymer in which the insoluble particulate polymer is dispersed, and which soluble polymer is soluble in the monomer mixture which results in the particulate polymer. In other words, and in process terms, the monomer mixture (which ultimately becomes the particulate polymer dispersed in a continuous polymer phase) is used to dissolve the polymer which forms said continuous phase. This procedure is termed endopolymerization. The dissolved polymer comprises 5 to 50 percent, usually 20 to 45 percent of the monomer-polymer mixture. A pigment concentrate is obtained which is used to pigment additional solid polymer.

3. The "particulate polymer dispersion" is a mixture containing the soluble polymer and, dispersed therein in concentrated form, the particulate polymer. Depending on the temperature of the mixture or presence of solvent, e.g., additional monomer, it may be either solid or a liquid with the particulate polymer dispersed therein. This concentrate is added to additional soluble polymer to form the final pigmented plastic article.

The particulate polymer or the particulate polymer dispersion may be used as an opacifying, flatting or pigmenting agent. When the particulate polymer or dispersion is to be incorporated in a polymer system, e.g., as an opacifying agent to given translucency to acrylic films and sheets, it can be added to a monomer mixture which is polymerized to form the polymer to by opacified. Alternatively, for pigmentation, the particulate polymer dispersion may be mixed with a resin or other material and then subjected to processing, such an extrusion or mill roll blending to give molding powders.

In many industrial applications utilizing polymeric materials, it is desirable to introduce translucency to obscure filaments or to produce special optical effects in said polymer or to reduce specular gloss of the sheet, molded product, film, or coating by utilizing various materials. Inorganic pigments such as titanium dioxide, barium sulfate, and silica have generally been utilized in the prior art. However, the opacifying agents of the prior art, although useful for many applications, present substantial difficulties and have undesirable side effects in certain environments. Specifically, if selected with proper particle size and refractive index and used at a high enough concentration, while generally providing good hiding power and diffusion, inorganic materials usually reduce luminous transmittance to unacceptable levels. Further, due to their high density, such inorganic materials often settle out during polymerization, thus do not yield consistent results, and often adversely affect the physical characteristics of the resultant material.

It is known that organic opacifying agents such as polystyrene may be used in place of the above inorganics to provide better hiding power at high levels of transmittance, but polystyrene has a tendency to lose opacifying capacity and filament hiding power during high temperature milling or extrusion of the polymeric mixtures.

The particulate polymer of the present invention, on the other hand, has good filament hiding power, translucence-imparting and light diffusion-imparting characteristics and does not suffer from the limitations of the prior art organic and inorganic materials. The particulate polymers provide pigments and flatting agents of a clear white appearance to provide plastics with varying but controllable degrees of diffusion, translucence, and hiding power. Moreover, when the crosslinked spheres of the present invention are utilized in producing translucent sheet material, the prior art limitations as to high temperature processing are overcome. The crosslinked spheres do not lose their opacifying characteristics when heated to the temperatures required for milling and polymerizing monomers such as methyl methacrylate to give high speed sheet or stock material production.

The objects of the present invention thus include the curing of the above deficiencies, by providing organic polymeric spheres which meet these requirements.

Further, an object is supplying polymers which can be blended with molding compositions or suspended in coating compositions and then utilized without loss of improved optical and physical characteristics.

Further objects will become obvious to those skilled in the art upon a review of the disclosure.

The drawing constitutes a flow sheet showing a method of preparing and methods of using the particulate polymer.

The particulate polymeric materials of the present invention are generally in the form of individual minute crosslinked spherical polymer particles which are or may be dispersed in a continuous phase polymer system. The optional continuous phase is a soluble polymer, that is, one which is soluble in the monomers that produce the crosslinked spheres and may be either solid or liquid depending upon the conditions present. The particulate polymer is crosslinked to a sufficient degree to control solubility and minimize or prevent agglomeration of these spheres in the soluble polymer in later prepared monomer-polymer mixes, or in a mixture of the soluble polymer and a solvent in which the particulate polymer is dispersed. Preferably, the primary crosslinking in the particulate polymers of the present invention is supplemented by secondary crosslinking agents which do not react during the original polymerization, but do react at higher temperatures present in, e.g., hot roll milling. The general amounts of said agents are set forth hereinafter.

The particulate polymer contains 87–99.99 percent, preferably 95–99.95 percent, of at least one monoethylenically unsaturated monomer, 0.01 to 3 percent, preferably 0.05 to 1.0 percent, of at least one polyunsaturated monomer, and, optionally, up to 10 percent of a polar monomer, on a weight basis.

A process for the production of the particulate polymers of the present invention is an endopolymerization technique wherein the monomer that will ultimately form the particulate polymer is polymerized in the presence of a soluble polymer selected so that phase separation takes place early in the polymerization process. When the phase separation occurs, the soluble polymer becomes the continuous phase and the polymerized monomers form the particulate polymer as distinct spherical particles dispersed in the soluble polymer phase. The resultant particulate polymer dispersion may be utilized as a flatting agent in, for example, acrylic films or as a component for solvent top coatings. Further, the product may be utilized as a pigment, or combined with dyes or other organic or inorganic fillers for use in coating compositions or for incorporation into stock polymeric materials, particularly molding powder or granules.

When the use is that of a light diffusing material, for example in acrylic sheet material, the particulate polymer dispersion is milled or broken up and placed in an additional monomer system wherein the soluble polymer is soluble. This monomer system is then polymerized leaving the original particulate polymer uniformly dispersed therein to provide the desired translucency, improved hiding power, and improved diffusion characteristics as compared with organic and inorganic pigments of the prior art. Alternatively, granules of the dispersion are blended with pellets of soluble polymer.

The particulate polymer is generally spherical in shape and of from about 0.5 to 30, preferably 1 to 20 microns in diameter. This particulate polymer is insoluble in the soluble polymer and is crosslinked to a degree sufficient to prevent melting under relatively high temperature processing, e.g., up to about 300° C., preferably up to at least about 250° C.

The pigment concentrates made by the endopolymerization procedure in accordance with the present invention contain from about 5 to 50 weight percent but usually about 20 to 45 weight percent, preferably about 30 to 40 weight percent based on the total mixture, of the soluble polymer and dispersed therein from 95 to 50, preferably from 70 to 60 percent by weight of the particulate polymer based on the total mixture. When used to make translucent articles such as lighting fixtures, from about 0.1 to 5 percent of the particulate polymer is dispersed in otherwise transparent plastic material. When used in larger amounts, as in Example 1, of from above 5 to about 50 percent of the particulate polymer, light transmission is markedly reduced or eliminated entirely to give an opaque article having a dead white appearance. The mixture for forming the particulate polymer further contains from 0.01 to 3.0, preferably from 0.1 to 0.5 weight percent based on the ethylenically unsaturated monomer, of the residues of at least one polyunsaturated crosslinking monomer in the phase separation polymerization step. A later, additional crosslinking step brought about by heating, as in milling, is preferably applied to give additional crosslinking of functional groups in the monomers used. Up to 10 percent of secondary crosslinking monomer is used. The amount of polyfunctional crosslinking monomer in the system is critical to the obtention of the spherical particulate polymer. This monomer must be present in amounts sufficient to prevent the prior art problems of particle distortion from occurring in milling and the like. In addition, the mixture may also contain other components as surfactants, release agents, iron scavenger, high and low temperature catalyst, and minor amounts of other crosslinkable monomers. In general, the viscosity should not be above about 7,000 centipoise nor below 800, as measured with a Brookfield LVF Syncro-lectric viscometer using a No. 4 spindle at 30 to 60 rpm. Preferably it is from 1,000 to 2,000 centipoises. These readings, of course, must be made with particulate polymer producing monomer concentration within the ranges noted above.

The soluble addition polymers of the present composition are thermoplastic homo- and co-polymers, having molecular weights in the range of about 20,000 and 200,000 preferably about 50,000 to 150,000 and may contain such nondeleterious components as mercaptans to lower the molecular weight, stabilizers such as salicylates, triazoles, phosphites, and release agents such as stearic acid and long-chain alcohols. In general, the glass temperature of such soluble polymers may vary considerably, but are usually at least 50° C. and preferably are greater than about 75° C. When a polystyrene is used, the polymer is usually a homo- or co-polymer of either styrene, an alkyl styrene, or a halogenated styrene. However, styrene is the preferred form. Where polyacrylics are utilized, the soluble polymer may contain up to 75 percent styrene residues, but usually contains up to about 40 percent polymerized acrylic and/or methacrylic esters. The preferred form of the soluble polymer contains methyl methacrylate normally present in amounts of at least 60 percent, preferably at least about 75 percent methyl methacrylate. The preferred comonomers for use with methyl methacrylate are alkyl acrylates of from about 1 to 8 carbon atoms, preferably about 1 to 4 carbon atoms. When utilizing copolymers of methyl methacrylate, the comonomers which form said polymers may be selected from alkyl, cyclic, and alicyclic methacrylates and acrylates; methacrylamides; acrylamides; alkylthio-meth- and alkylthio-acrylates; styrene and other vinyl aromatics; halogenated styrenes; vinyl acetate; vinyl halides; and combinations thereof. When utilizing copolymers of methacrylates, the comonomers should be present in amounts varying from 1 to 40 weight percent preferably from 5 to 15 weight percent, based on the total monomers, the remaining amounts being methyl methacrylate residues. Further, when using alkyl substituted comonomers, while it is not necessary to limit the length or number of alkyl groups, it is preferably that such groups remain within the range of from about 1 to 20 carbon atoms per monomer molecule. The use of such varying monomers, would depend upon the final use to which the polymer mixture is to be applied, and does not necessarily limit the polymers that may be utilized in preparing the present polymers. Exemplary of the various polymer systems which may be utilized as the soluble polymer are poly(methyl methacrylate), polystyrenes (e.g., alkyl, halogenated or unsubstituted styrenes) polyvinyl chloride, polyvinyl acetate, etc. The preferred soluble polymers are acrylics, and it is most preferred that such polymers contain at least 50 percent acrylic and/or methacrylic acid esters.

The ethylenically unsaturated monomers utilized in the preparation of the particulate polymers of the present invention may be selected from a wide variety of single monomers or combinations thereof. The selection of specific monomers or combinations of monomers impart specifically desired properties to the resulting polymer, such as hardness, refractive index, outdoor durability, water sensitivity, etc. Thus, a broad range of ethylenically unsaturated monomers may be utilized, but the combinations and particle size must be controlled in order to meet the use requirements of the present invention. Exemplary monomers, and the refractive index ($N_r$) of the polymers thereof are as follows:

| Monomer | Polymer Refractive Index |
|---|---|
| methyl acrylate | 1.4793 |
| ethyl acrylate | 1.4685 |
| isopropyl acrylate | 1.456 |
| n-butyl acrylate | 1.463 |
| 2-ethylhexyl acrylate | 1.465 |
| cyclohexyl acrylate | 1.500 |
| methyl methacrylate | 1.4890 |
| ethyl methacrylate | 1.483 to 1.485 |
| isopropyl methacrylate | 1.473 |
| t-butyl methacrylate | 1.4638 |
| n-butyl methacrylate | 1.4830 |
| isobutyl methacrylate | 1.477 |
| t-butyl methacrylate | 1.464 |
| n-hexyl methacrylate | 1.481 |
| phenyl methacrylate | 1.571 |
| cyclohexyl methacrylate | 1.5064 |
| 2-methyl cyclohexyl methacrylate | 1.5028 |
| bornyl methacrylate | 1.5059 |
| 2-cyclohexyl-cyclohexyl methacrylate | 1.5191 |
| benzyl methacrylate | 1.5680 |
| styrene | 1.5916 |
| pentachlorophenyl methacrylate | 1.6080 |
| ortho-chlorostyrene | 1.6100 |
| α-naphthyl methacrylate | 1.6411 |
| methyl methacrylate and ethyl acrylate (50/50) | 1.4788 |
| methyl methacrylate and t-butyl methacrylate (70/30) | 1.4814 |
| benzyl methacrylate and styrene (50/50) | 1.5798 |
| bornyl methacrylate and o-chlorostyrene (30/70) | 1.5787 |
| methyl methacrylate and benzyl methacrylate (50/50) | 1.5285 |
| ethyl acrylate and styrene (30/70) | 1.5579 |
| ethyl acrylate and styrene (70/30) | 1.5130 |

It is to be noted that styrene, phenyl methacrylate, benzyl methacrylate, pentachlorophenyl methacrylate, orthochlorostyrene, and α-naphthyl methacrylate and blends thereof with each other and other monomers have refractive indices such that any of them can be used in the same way as styrene, provided the soluble polymer is of a nature and is present in an amount to give phase inversion, to form the particulate crosslinked polymer by the endopolymerization process.

The polyunsaturated crosslinking monomers which are utilized in the present invention are present in order to render the particulate polymer insoluble and less thermoplastic. Usually from 0.01 to 3.0 weight percent, preferably from about 0.1 to 0.5 weight percent of such functional monomers is utilized to crosslink the particulate polymer, based on the total monomers that form the particulate polymer in the primary crosslinking.

The amount of crosslinking monomer is limited by the desired later processing characteristics. The extent of crosslinking, thus, must be sufficient to render the polymer relatively infusible during steps such as hot roll milling or extrusion wherein these steps are to be utilized. The preferred polyfunctional monomers for primary crosslinking the phase separation step are selected from diacrylic esters of glycols wherein the acrylic group is the residue of acrylic acid or a substituted acrylic acid, such as methacrylic acid. The glycols contain about 2 to 10, preferably about 2 to 6 carbon atoms. Exemplary monomers are those formed by the reaction of acrylic or methacrylic acid with ethylene, propylene, butylene, or hexamethylene glycols. In addition, divinyl benzene; divinyl or diallyl compounds, such as the divinyl ethers or the above glycols; diallyl phthalate; triallyl cyanurate; and other similar monomer residues having more than one polymerizable group may be present. Additional polyethylenically unsaturated compounds include the following: divinylbenzene, divinylpyridine, divinyltoluenes, divinylnaphthalenes, diallyl phthalate, 1,3-divinylxylene, divinylethylbenzene, divinylsulfone, polyvinyl or polyallyl ethers of glycol, of glycerol, of pentaerythritol, of mono- or dithio- derivatives of glycols, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, 1,2-di(α-methylmethylene sulfonamido)ethylene, trivinylbenzene, trivinylnaphthalene, and polyvinylanthracenes. Substantially any monomer having more than one addition-polymerizable olefinic group is useful. These are well known to those in the art. Where such compounds are substituted, the chain length of such substitutions is not critical, but usually varies from about 1 to 20, preferably about 1 to 4 carbon atoms.

The polymer particles preferably are made more infusible by secondary or latent crosslinking. Such mnomers contain reactive groups which are capable of reacting with themselves or with other groups present in the polymer chain to thereby impart crosslinking during the original polymerization or at a later time. Generally, the later crosslinking would occur during such steps as hot roll milling, banbury mixing, or extrusion of the polymer mass. The monomer residues which are suitable for this function include those that are residues of acrylics, and can be best exemplified by the following: acrylic acid; methacrylic acid; acrylamide; methacrylamide; epoxyalkyl acrylates or methacrylates, e.g., glycidyl methacrylate; monoacrylic acid esters of glycols; hydroxyalkyl acrylates or methacrylates, isocyanatoalkyl acrylates and aminoalkyl acrylates or methacrylates, as well as other compounds described below.

Examples of the secondary or latent crosslinking reactions which are possible using heat and/or catalysis are:

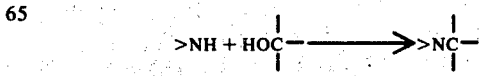

-continued

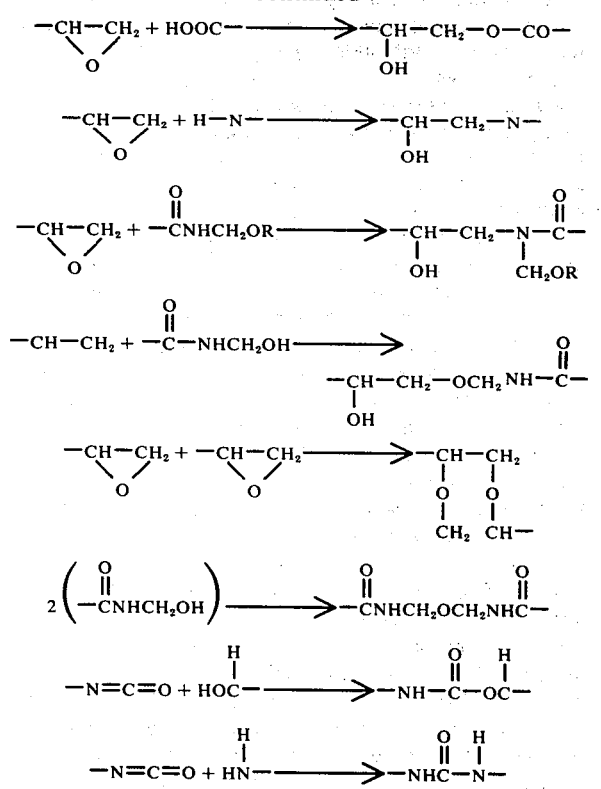

Addition polymerizable unsaturated monomers containing such groups are well known in the art, examples being isocyanates such as isocyanatoethyl methacrylate, epoxy compounds such as glycidyl methacrylate, aminoalkyl compounds such as methylaminoethyl methacrylate, and t-butylaminoethyl methacrylate, amides such as methacrylamide, guanamines such as 4-pentenoguanamine, hydroxyalkyl esters such as hydroxypropyl methacrylate and hydroxyethyl methacrylate, nitriles such as methacrylonitrile, N-alkoxyalkyl amides such as methoxymethyl methacrylamide, hydroxyalkyl amides such as N-methylol methacrylamide, the analogs of the above methacrylic acid derivatives with other unsaturated acids such as acrylic acid and itaconic acid, such acids themselves, dicarboxylic acids such as maleic acid and half esters and half amides thereof, vinyl ethers of glycols such as ethylene glycol, and so forth.

As may be seen, the latently crosslinkable addition polymerizable unsaturated monomers have reactive polar groups selected from those including

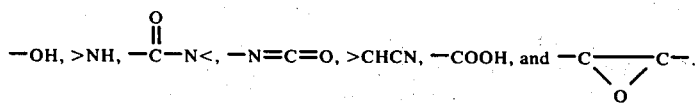

Generally, such secondary crosslinking monomers are present in amounts of from 0.05 to 10 percent, preferably from 0.1 to 3 percent by weight, based on the total monomers that form the particulate polymer. When such monomers are utilized, and contain alkyl groups, the groups usually contain from about 1 to 20, preferably about 1 to 4 carbon atoms. The preferred comonomer is methacrylic acid and is usually utilized in amounts of less than 2 percent by weight.

The small polymer particles are crosslinked throughout by the combination of the primary polyunsaturated crosslinking monomer, and preferably by secondary crosslinking. They remain relatively infusible and nondeformable when mixed into molding powder compositions, and subjected to high shear forces inherent in e.g., injection molding processes such as those currently utilized in preparing articles of commerce. A convenient method of showing the amount of crosslinking, and thus the non-deformation characteristics, is the swelling ratio. This ratio is the weight ratio of the polymer upon saturation with a solvent, such as methylethyl ketone, as compared to the dry polymer. In the present invention, the swelling ratio may be up to 10 in the original polymer. The swelling ratio should be limited to less than about 7 and preferably less than about 5 in the final product, that is the fully crosslinked material.

The polymerization reaction for preparing the particulate polymer in the present invention is conveniently effected by conventional free radical polymerization, e.g., catalysts such as redox catalysts and peroxy compounds, heat or irradiation. In general, these catalysts are present in amounts of from about 0.02 to 1.0, preferably from about 0.2 to 0.5 weight percent, based on the total monomers that form the particulate polymer. The catalyst is usually a combination of both high and low temperature components so that the above-noted secondary or post polymerization crosslinking is enhanced. Exemplary catalysts include benzoyl peroxide, acetyl peroxide, t-butyl peroctoate, dicumyl peroxide, azoisobutyronitride (AIBN), t-butyl peracetate, etc. Moreover, either heat or irradiation, or a single compound catalyst in combination with heat and/or irradiation may be utilized. Further, it should be noted that metal accelerators are often useful when irradiation catalysis is used, for example with the use of ultra-violet light. Heat or radiation functions can be used in combination with other free-radical generating materials.

Heat is desirably used to effect the secondary crosslinking and may be applied during further processing, such as in mill roll blending.

The particulate polymers of the present invention may be produced by various methods, for example, milling of larger particles, emulsion polymerization and suspension polymerization. In the preferred form, however, the following process of the production of the particulate polymer of the present invention is used. A particulate polymer producing monomer-soluble polymer syrup may be prepared by dissolving the soluble polymer in the ethylenically unsaturated monomer at a temperature of about 25° to 20° C., preferably about 40° to 60° C. with, e.g., agitation. The temperature utilized in this step is, of course, limited by the characteristics of the chemical components present, as well as the speed at which the dissolution is to be affected. After dissolution, or during the dissolution step, the remaining monomeric materials, i.e., a crosslinking monomer or monomers and other components, and a free-radical producing catalyst are added. At this point, the viscosity of the mixture is usually relatively high, but varies according to the relative amounts of the different polymers desired in the final product. In general, the viscosity of the mixture should not be great enough to cause problems during agitation, or premature gelation. While not critical, the viscosity usually varies from about 800 to 7,000, preferably about 1,000 to 2,000 centipoises, as measured with a Brookfield type LVF viscosometer with a No. 4 spindle rotating at 30 rpm.

The mixture may then be bulk polymerized by heating to a temperature of from about 40° to 175°, usually about 45° to 130° C., preferably from about 50° to 70° C., for a period which varies according to the amount of catalyst present in the reaction mixture, but which is usually from about 5 to 30, preferably from about 18 to 24 hours. During this time, phase separation occurs, and the solid crosslinked monomers become dispersed in a continuous phase of the soluble polymer. The reaction may be effected under pressure, but this is not necessary, since polymerization proceeds without it. However, when it is desired to utilize pressure, it usually varies from about 20 to 120 psig, preferably about 80 to 100 psig. When pressure is used the polymerization temperature may be up to about 140° C.

It is often preferred to vary the temperature during the course of the polymerization. When this is done, the temperature is either increased at intervals to a final temperature within the ranges noted above, or increased gradually when using increased charges. The first polymerization period, of the lowest temperature, is usually the longest and such changes are effected in order to adjust the polymerization and particle size within the above-noted ranges.

The concentrated particulate polymer dispersions of the present invention (5 to 50 percent continuous phase soluble polymer) are solid materials at room temperature and are granulated and mixed with additional soluble polymer in order to produce an easily extrudable mixture. This mixture is then extruded, stranded, and pelleted to produce polymer products which may be utilized in various ways. For example, the material may be cast, extruded, injection molded, etc. into any desired form, or may be subjected to further treatment by cooling to solidification, and then, for example, milling or banburying to produce smaller particles which may be utilized as an additive to render polymeric material translucent. For example, the milled polymer product may be added to conventional acrylic sheet-producing compositions in the same manner as known in the prior art for the use of materials such as titanium dioxide and barium sulfate. Upon completion of the polymerization of the sheet-producing monomer, the polymer mixture is formed into e.g., sheets, by for example, banburying followed by hot roll milling. The products are translucent materials with good light diffusion characteristics.

The polymer may also be injection molded to produce shaped articles. When this is done, the molding is usually effected by mixing the particles with the desired major component of an injection molding composition, heating the mixed polymers to a plastic state, e.g., about 150° to 300° C., preferably about 185° to 210° C., and injecting into the mold at a pressure at least sufficient to fill the cavity, depending on the machine used and the piece molded. The mold is then cooled to as low as room temperature, broken open and the product removed.

The self-supporting structural sheet material produced by this process may contain small amounts, e.g., from about 0.1 to 15 weight percent of known opacifying agents, e.g., titania and barium sulfate, in addition to the crosslinked polymer spheres of the present invention.

Various other polymerization reaction additives may be utilized, as is well known in the art. Exemplary of such materials are: stabilizers, release agents, inhibitors, heat stabilizers, colorants, and molecular weight regulators.

Further, the particulate polymeric product of the present invention may be utilized as flatting agents in solvent-coating processes in amounts of from 3 to 25 percent by weight, preferably from about 8 to 15 percent by weight, in order to give improved reduced reflectance of light incident to the surface of the coated material. Such solvent coating compositions contain conventional solvent coating materials as well as the above polymer particles either alone or in another polymer. Exemplary of the composition is (1) a film-forming polymer, and (2) a solvent system, e.g., MEK and a high boiling solvent.

When the polymer compositions of the present invention are utilized as, e.g., flatting agents, they give a product that is translucent, but does not have the glare present in the compositions of the prior art. Such compositions contain from about 0.1 to 5 percent by weight, preferably about 1 to 4 weight percent based on the total composition of the particulate polymer. As an opacifying agent, up to about 50 percent of the particulate polymer in the end product is useful. The composition is useful in laminates as well as single layer sheets or other molded, cast, or extruded shaped articles. When coating with the present polymer as flatting agents, a solvent is used to apply the coating. Generally, the solvent may be any of those conventionally utilized in the art, but, of course, must be one that will dissolve the film-forming polymer, when present, to a degree that will allow, e.g., spray coating. In addition, the composition may contain from about 0.1 to 20, preferably about 0.5 to 10 weight percent of other conventional materials.

In addition, the polymer mixtures of the present invention may be utilized in combination with, e.g., dyes and pigments in order to impart colors to the products. These additions may be made to either the cast sheet formulations or to molding powder compositions and produce pallet spread colors. Conventional dyes of both organic and inorganic nature, and commonly employed in plastics may be utilized. Such dyes and pigments are usually present in amounts of from about 0.05 to 3, preferably about 0.1 to 2, weight percent based on the total compositions.

Sheets of film is an example of other products which are produced in accordance with the invention.

EXAMPLES

The following examples illustrate the salient features of this invention but are not to be taken as the only combinations possible.

EXAMPLE 1

The monomer polymer syrup is prepared by dissolving, in a stainless steel tank fitted with an appropriate stirring device, 36.43 pounds of an acrylic polymeric molding powder or about 15% ethyl acrylate copolymerized with about 85 percent of methyl methacrylate, in 60.72 pounds of polymer grade styrene monomer held at 50° C. After three hours of stirring, the polymer is completely dissolved. The following ingredients are then added with appropriate stirring to insure that each is completely mixed before the next is added:
a. 0.307 pound stearic acid
b. 1.233 pounds of glycidyl methacrylate
c. 0.808 pound of glacial methacrylic acid
d. 0.061 pound of butylene diacrylate
e. 0.390 pound of benzoyl peroxide containing 25% water
f. 0.050 pound of t-butyl peracetate catalyst The completed mix has a viscosity of approximately 1,500 centipoise when measured at 25° C.

This mix is then pumped into a bag container made from polyvinyl alcohol (PVA) film and bulk polymerized in an air circulating oven for 16 hours at 65° C., 2 hours at 80° C., and then 4 hours at 125° C. After removing the PVA film from this slab of polymer, dead white in appearance and measuring approximately 1 inch in thickness, it is broken and further granulated into particles capable of passing through a 5/16 inch mesh screen. To each 100 pounds of this granulated polymer, is added 24.3 additional pounds of the above molding powder and the entire mixture is blended thoroughly by tumbling for approximately one hour. This polymer blend is then passed through a conventional extruder, stranded, and cut into ⅛ inch square cubes by standard commercial processes. This gives a 50—50 mixture of particulate polymer and soluble polymer, still opaque and dead white in appearance.

This pigment concentrate is the basic pigmenting material with which the following compositions (except those prepared for comparison with the invention) are manufactured. It is composed of equal mixtures of a thermoplastic acrylic polymer forming a continuous phase, and crosslinked polystyrene spherical particles approximately 1 to 15 microns in diameter dispersed therein.

EXAMPLE 2

A solution of 10 percent by weight of uncrosslinked polystyrene in methyl methacrylate monomer is prepared by mixing. The ingredients are mixed over night at room temperature. A similar mixture is prepared from the polymer made according to the disclosure of Example 1, with 10 parts of the 50—50 particulate polymer dispersion being dispersed in 90 parts of methyl methacrylate.

Appropriate casting mixes are prepared from the concentrated solution and the dispersion in such a way that sheet specimens could be cast from them on a rapid 2½ hour cycle under pressure with proportions of materials being adjusted so that each sheet contains approximately 0.412 percent polystyrene or particulate crosslinked polymer. During polymerization of the sheets, the uncrosslinked polystyrene phase separated to give particles of about 1 micron in size. The total white light transmission (WLT) of the 0.125 inch thick translucent sheets is the same, both readings being approximately 67 percent. Both sheets gave the appearance of a blue-white translucent color, but when an incandescent tungsten filament lamp bulb is viewed through the sheets, the sheet prepared from the crosslinked polystyrene made according to the procedures of this invention completely obscured the filament, whereas that made from the conventional polystyrene did not. This clearly shows that the particle size of the polystyrene in the sheet prepared by the rapid polymerization process is considerably reduced below the range needed for good light scattering characteristics, whereas that prepared from the preformed crosslinked polystyrene particles of this invention retained their shape and size giving a finished translucent cast sheet with characteristics acceptable for commercial applications. The properties of the sheets appear in Table 1.

Table 1

| Type Particulate Polymer | Polymerization | Hiding Power Data | | |
| --- | --- | --- | --- | --- |
| | | WLT[1] at 0.125'' | Goniophotometric Hiding Power[2] | Visual Hiding Power |
| uncrosslinked polystyrene | 2½ hr. cycle (pressure reactor) | 67% | 0.69 | Tungsten filament visible |
| crosslinked prod. of Example 1 | 2½ hr. cycle (pressure reactor) | 67% | 1.00 | Tungsten filament obscured |

[1]Luminous transmittance.
[2]High resolution goniophotometry where the above value is the ratio of the energy transmitted on a line normal to the surface.

EXAMPLE 3

Ten grams of the polymeric material prepared according to Example 1 are dissolved in 90 grams of an equal mixture of methylene dichloride and methylethyl ketone. This solution is sprayed onto a small acrylic sheet ⅛ inch thick. After the polymer film has dried, it exhibits good light scattering quantities giving a translucent coating having a low level of reflectivity. This demonstrates the applicability of these polymer systems as flatting lacquers as well as compositions useful for the manufacture of rear projection viewing screens such as used in computer or calculating machines, the television or motion picture industry, photography, etc.

EXAMPLE 4

Twenty parts of a 90 part methyl methacrylate/10 part ethyl acrylate copolymer having a viscosity average molecular weight of 135,000 are dissolved in 80 parts of a monomer mix composed of 83 parts butyl acrylate/17 parts styrene, 0.35 part butylene diacrylate and 0.04 part benzoyl peroxide. After polymerization of this mixture for 24 hours at 66° C., 2 hours at 80° C., and 4 hours at 120° C., the polymer is granulated into 3/16 inch particles. A major portion of the crosslinked butyl acrylate/styrene copolymer particles in this case measure up to 30 microns in diameter with others going down to considerably smaller particle sizes and are dispersed in a continuous phase of the methyl methacrylate-ethyl acrylate copolymer.

Twenty-five parts of this polymer and 16 parts of rutile $TiO_2$ are blended with 59 parts of an extrudable film-forming acrylic polymer of methyl methacrylate and butyl acrylate and thoroughly subjected to malaxation in an extruder from which it is stranded and pelletized by standard commercial techniques. Pellets from this mixture are extruded and blown into a thin sheet of film. The 10–30 micron diameter particles which are in the vicinity of the surface of these films reduce specular reflectance without appreciable loss of the tear strength of the films. It is well known in the art of film manufacture that large (50 micron) particles of silica, when incorporated into the film base, will also induce a surface flatting action, but these fillers adversely affect the strength properties. Thus the rubber-like crosslinked particles that are produced by the process of this invention have utility in the manufacture of acrylic film in which they act as flatting agents with inherent reinforcing qualities.

EXAMPLE 5

The procedure and compositions disclosed in Example 1 are followed except that polystyrene is substituted as the soluble polymer and is dissolved in methyl methacrylate which is substituted for the styrene monomer. The polymerization is effected to produce crosslinked poly(methyl methacrylate) spheres less than 30 microns in diameter in a continuous phase of polystyrene and then granulation, extrusion blending, and pelletization are effected. This polymer is useful for the preparation of flatting and translucent film-forming lacquers in the production of rear projection screens and in pigmenting hydrocarbon resins.

EXAMPLE 6

Benzyl methacrylate, which has a high refractive index, is substituted for the methyl methacrylate of Example 5, thus producing another high refractive index crosslinked polymer dispersed in polystyrene. Five parts of this polymer mixture is redispersed in 95 parts of a casting mix composed of 75 parts of a monomer mixture of 95 percent methyl methacrylate and 5 percent butyl acrylate and 25 parts of poly(methyl methacrylate), which is put in a casting mold and polymerized. This gives a sheet containing a high concentration of particles with characteristics well suited for scattering light.

EXAMPLE 7

Table II shows the composition and physical characteristics of several particulate polymer compositions prepared in accordance with Example 1, but varying the makeup of the soluble polymer and monomer mixture. The same procedure and types and amounts of crosslinkers were used. The samples are utilized in the tests shown below.

Table II

| | Identification of Endopolymer Samples | | | | | |
|---|---|---|---|---|---|---|
| | Soluble Polymer | | | Crosslinked Particles | | |
| Sample No. | Composition[5] MMA/EA | MW (× 10⁻⁵) | Conc. % | Size[3] Range ($\mu$) | Avg.[3] Size ($\mu$) | Monomer Composition BA/S[5] |
| A | 87/13 | 1.1 | 50[4] | 5 | 5 | 0/100 |
| B | 87/13 | 0.7 | 50[4] | 20–80 | 40 | 0/100 |
| C | 90/10 | 1.35 | 70 | 10–15 | 10 | 87/13 |
| D | 90/10 | 1.35 | 70 | 10–20 | 15 | 87/13 |
| E | 90/10 | 1.35 | 80 | 20–60 | 30 | 87/13 |
| F | 87/13 | 1.1 | 70 | 15–40 | 20 | 87/13 |

[3]The size range and average size are for particles easily seen at 80X.
[4]Endopolymerized at 62.5% concentration in the soluble polymer, then diluted to 50%.
[5]MMA is methyl methacrylate; EA is ethyl acrylate, BA is butyl acrylate and S is styrene. Where compositions are shown, the ratios are those of the major components.

The properties of various laminates are shown in Table III. In preparing the laminate, an aluminum sheet is spray coated with a solvent solution of an acrylic or vinylic adhesive. The solvent, which is a mixture of compositions such as ethylene dichloride (EDC) and methylethyl ketone (MEK), is allowed to evaporate, and the coating heated to about 205° C. to activate the adhesive. An extruded-blown film (see Example 4) of the type noted is then applied to the activated adhesive and the laminate passed through nip-rollers while hot to produce the products tested.

In the tests shown, the following procedures are followed:

1. Gloss-laminate ASTM 0-523-66T, showing percent reflection at the given angle.
2. T-bend data. The $T_0$, $T_1$, etc. ratings are the sum of the lengths of cracks on the bend over the length of the bend where the crack lengths equal or exceed the length of the bend then the rating is deemed to be 10, with property decreases below a ratio of 1:1. $T_0$ is a single 180° bend while $T_1$ is a recorded 180° bend on the first. The result is an increasing bend radius as the T number increases, i.e., $T_0$ is two layers, $T_1$ is three layers, $T_2$ is four layers, etc.

Table III

| | Aluminum Laminate Properties of Polymer (6) Containing 16% TiO₂ and Endopolymer | | | | | | |
|---|---|---|---|---|---|---|---|
| | Films Containing 10% Endopolymer | | Films Containing 25% Endopolymer | | | Standard Gloss Control[6] | Low Gloss Control Flatting Agent[9] |
| Polymer from Table II | F | E | D | F | E | | 20 |
| Avg. Part. Size ($\mu$) | 20 | 30 | 15 | 20 | 38 | — | |
| Gloss % | | | | | | | |
| 60° | 27 | 25 | 15 | 15 | 15 | 55 | 20 |
| 80° | 28 | 26 | 20 | 15 | 10 | 86 | 24 |
| T-Bend Rating[7] | | | | | | | |
| $T_0$ | 9 | 5 | 10 | 10 | 10 | 3 | 10 |
| $T_1$ | 1 | 1 | 5 | 5 | 9 | 0 | 10 |

Table III-continued

| | Aluminum Laminate Properties of Polymer (6) Containing 16% TiO₂ and Endopolymer | | | | | |
|---|---|---|---|---|---|---|
| | Films Containing 10% Endopolymer | | Films Containing 25% Endopolymer | | Standard Gloss Control[8] | Low Gloss Control Flatting Agent[9] |
| $T_2$ | 0 | 0 | 0 | 0 | 1 0 | 4 |
| $T_3$ | — | — | — | — | 0 — | 1 |

[6]The polymer is the extrudable film forming acrylic polymer of Example 4.
[7]Preformed on arbor press, average of 4 specimens, 1 rating = 10% cracking on bend, 10 rating = 100% cracking on bend.
[8]Containing no flatting agent.
[9]Containing 4% silica gel flatting agent.

In Table IV below, the characteristics of free films containing various gloss changing materials are given. In these tests, the following procedures are utilized:

A. Gloss - film ASTM D-2457-65T as above.

B. Tensile data ASTM D-882-64T Jaw separation rate 2 inches per minute and 4 inch gauge length of sample. All data under this entry obtained from this test.

C. Tear resistance ASTM D-1003-66.

Table IV

| | Free Film Properties of Unpigmented Polymer (6) Containing Endopolymers | | | | | | Standard Gloss Control[8] | Low Gloss Control[9] |
|---|---|---|---|---|---|---|---|---|
| | Films Containing 10% Endopolymer | | | Films Containing 25% Endopolymer | | | | |
| Polymer from Table II | C | F | E | A | E | D | | |
| Avg. Part. Size ($\mu$) | 10 | 20 | 30 | 5 | 40 | 15 | | 20 |
| Gloss | | | | | | | | |
| 60° | 32 | 46 | 32 | 19 | 16 | 24 | 55 | 15 |
| 85° | 31 | 41 | 45 | 24 | 10 | 36 | 75 | 20 |
| Tensile | | | | | | | | |
| Break Elongation(%) | 80 | 120 | 90 | 35 | 5 | 91 | 70 | 37 |
| Max. Stress ($10^{-3}$psi) | 5.9 | 2.1 | 4.2 | 4.8 | 6.7 | 3.8 | 4.8 | 4.2 |
| Modulus ($10^{-5}$psi) | 2.2 | 2.2 | 2.0 | 2.3 | 3.1 | 1.8 | 2.1 | 1.9 |
| Toughness ($10^{-3}$in-lb/in$^{-3}$) | 4.2 | 4.0 | 3.2 | .18 | .1 | 3.3 | 2.5 | 1.0 |
| Tear Resistance | | | | | | | | |
| lb/mil | — | .89 | .83 | — | — | .66 | .95 | .75 |
| in-lbs/mil | — | .077 | .069 | — | — | .065 | .060 | .040 |

I claim:

1. A process for the preparation of a finely divided particulate polymer and modifying the appearance of plastic sheets, films, and the like therewith comprising the steps of:
   I. providing a monomer system (1) capable of free radical addition polymerization comprising:
      A. 87 to 99.99 percent by weight of a monoethylenically unsaturated monomer, based on total monomer weight,
      B. 0.01 to 3 percent by weight of at least one polyunsaturated monomer, based on total monomer weight;
   II. placing into essentially complete solution in said monomer system, 5 to 50 percent by weight of the total mixture, of a soluble thermoplastic addition polymer (2), said polymer (2) resulting from at least one different monomer than those of monomer system (1), the polymer from the monomer mixture being insoluble in the thermoplastic polymer;
   III. subjecting the solution of (1) and (2) to conditions that will free-radical polymerize the monomer system to form essentially spherically shaped crosslinked polymer particles, said particles having an average diameter in the range of 0.5 to 30 microns dispersed in a continuous phase of polymer (2), said particles being insoluble in said addition polymer (2); and
   IV. adding the resultant concentrate of particles to addition polymerized monomers, in which the crosslinked particles are insoluble, the refractive index of the polymer particles being such as to obtain a product having an opaque, pigmented, or flatted appearance different than would be the case absent said polymer particles.

2. The process of claim 1 wherein said conditions include heating the mixture to from 40° to 125° C.

3. The process of claim 1 wherein there is additionally present from 0.05 to 10 percent by weight of the total amount of copolymerized monomers in said particles of at least one secondary crosslinking monomer which crosslinks by means of polar groups on the monomer molecule.

4. The process of claim 1 wherein said monoethylenically unsaturated monomer is present in an amount of from 95 to 99.95 weight percent and said polyunsaturated monomer is present in an amount of from 0.05 to 1.0 percent by weight.

5. The process of claim 1 wherein there is additionally present from 0.1 to about 3 weight percent of the total copolymerized monomers in said particles, of at least one secondary crosslinking monomer, which crosslinks by means of polar groups in the secondary crosslinker.

6. The process of claim 5 wherein said monoethylenically unsaturated monomer is selected from the group consisting of styrene, substituted styrene.

7. The process of claim 1 wherein said thermoplastic polymer is an acrylic polymer.

8. The process of claim 7 wherein said polymer contains more than 50 weight percent copolymerized methyl methacrylate.

9. The process of claim 8 wherein said methyl methacrylate residues are present in an amount of at least 90 weight percent.